(12) United States Patent
Gilvar et al.

(10) Patent No.: US 6,409,090 B1
(45) Date of Patent: Jun. 25, 2002

(54) SELF-OPTIMIZING DEVICE FOR CONTROLLING A HEATING SYSTEM

(75) Inventors: David L. Gilvar, Weston, MA (US); Steven G. Landry, Brookline; Steven P. Harter, Merrimack, both of NH (US)

(73) Assignee: Microtherm LLC, Wellesley, MA (US)

( * ) Notice: Subject to any disclaimer, the term of this patent is extended or adjusted under 35 U.S.C. 154(b) by 0 days.

(21) Appl. No.: 09/572,878

(22) Filed: May 18, 2000

(51) Int. Cl.$^7$ ............................................... G05D 23/00
(52) U.S. Cl. .................. 237/2 A; 122/448.1; 236/46 R
(58) Field of Search ............................. 237/2 A, 8 A; 122/448.1; 236/46 R

(56) References Cited

U.S. PATENT DOCUMENTS

| | | | |
|---|---|---|---|
| 2,266,245 A | 12/1941 | Osterheld | 219/39 |
| 2,266,253 A | 12/1941 | Osterheld | 219/39 |
| 4,381,075 A | 4/1983 | Cargill et al. | 237/8 R |
| 4,466,383 A | * 8/1984 | Klatt et al. | 122/379 |
| 4,470,541 A | 9/1984 | Raleigh | 236/21 B |
| 4,850,310 A | 7/1989 | Wildgen | 122/46 F |
| 5,470,019 A | 11/1995 | Mårtensson | 237/19 |
| 5,775,582 A | 7/1998 | Hammer | 237/8 A |
| 5,960,639 A | 10/1999 | Hammer | 62/158 |
| 5,971,284 A | 10/1999 | Hammer | 236/11 |

* cited by examiner

*Primary Examiner*—Harold Joyce
*Assistant Examiner*—Derek S. Boles
(74) *Attorney, Agent, or Firm*—Thomas J. Engellenner; Nutter McClennen & Fish LLP

(57) ABSTRACT

A self optimizing device for controlling a heating unit in a manner so as to improve the energy efficiency of the heating unit using an autocalibration processor. The heating unit employs a heating medium that is heated by the heating unit and which transfers the heat into an ambient atmosphere outside of the heating unit. The heating unit has an on-state initiated when a characteristic of the heating medium representative of the heating capacity of the medium decreases below a minimum level, and an off-state initiated when the characteristic of the heating medium reaches a maximum level. The controller includes an input element, an output element, a time-measuring element, and a processor. The input element receives a signal from a sensor, the signal indicating the heating medium characteristic representative of the heating capacity of the heating medium. The output element signals the heating unit to begin its on-state. The time-measuring element measures an off-time, the off-time being the length of time from initiation of the off-state of the heating unit until the characteristic of the heating medium decreases below the minimum level. The processor determines a delay time and for signaling the heating unit to delay initiation of the on-state by the delay time amount, the extension of the off-time resulting in an energy savings over an undelayed initiation. The processor further comprising an autocalibration processor for determining a delay time that results in optimum energy savings.

24 Claims, 5 Drawing Sheets

SELF-OPTIMIZING DEVICE FOR CONTROLLING A HEATING SYSTEM

BACKGROUND OF THE INVENTION

The present invention relates generally to heating and cooling systems, and particularly to a self-optimizing device to improve their efficiency.

In many areas of the world, temperature conditions exist in which humans cannot live comfortably and/or machinery cannot function properly without the supply of artificial cooling, and in particular, artificial heat to their immediate surroundings. In these areas, boilers, typically fueled by oil or gas, are often employed to provide this artificial heat as well as a supply of hot water.

Boiler manufacturers are chiefly concerned that their boilers are able to provide adequate artificial heat during the most extreme cold temperatures known in regions in which the heating equipment is sold. With few exceptions, however, most users never experience such extremely cold temperatures, or only experience them rarely, while more typically experiencing mildly cool temperature conditions (such as fifty degrees Fahrenheit, for example) that nonetheless require artificial heat, and they use the same boiler to provide artificial heat under these disparate temperature conditions. Similarly, those who purchase boilers, such as builders or those responsible for maintaining heating systems in commercial or residential buildings, tend to over-specify the requirements of their heating systems so that the systems will be more than effective under the coldest possible conditions. As a direct consequence boilers are almost always over-dimensioned for the typical conditions in which they are employed. This, in turn, results in the boilers having a low operating efficiency under normal operating conditions.

In a typical heating system, a boiler is used to heat a heating medium (water, for example) which is used to transfer heat to the environment to be heated. As the heating medium transfers heat, its temperature drops—the rate at which its temperature drops varying with the thermal load on the heating system. When the temperature of the heating medium drops to a predetermined minimum value, the boiler turns on (initiating a boiler "on-time") to raise the temperature of the heating medium. The boiler then raises the temperature of the heating medium until it reaches a predetermined maximum level, at which time the boiler shuts off (completing the boiler on-time and initiating a boiler "off-time"). As the thermal load on the heating system drives down the temperature of the heating medium to the predetermined minimum, the boiler turns on (completing the boiler off-time and initiating a new boiler on-time) and the heating cycle repeats.

U.S. Pat. No. 5,470,019 to Mårtensson (which is hereby incorporated herein by reference) addresses the problem of inefficiency due to boiler over-dimensioning by providing a boiler with improved efficiency based on a modification of the off-time of the boiler. The Mårtensson boiler includes a microprocessor, which measures the off-time and multiplies that time amount by a predetermined, inputted number (a multiplying factor) less than or equal to one and stores the resulting time data measurement which it uses as a delay time to extend the off-time of the boiler. That is, when the heating medium reaches its predetermined minimum temperature and the boiler is signaled to reactivate, the boiler will not be reactivated immediately. Rather, the microprocessor will delay the activation of the boiler for an amount of time equal to the calculated delay time.

Usage of the Mårtensson device results in improved boiler efficiency as explained therein by reference to FIGS. 2–5. But, in order to improve boiler efficiency, the Mårtensson device relies upon a manually-inputted, predetermined number, and continues to use that same number to determine the resulting time data measurement until the number is manually reprogrammed.

Therefore, while use of the Mårtensson device improves boiler efficiency, in order to provide the improved boiler efficiency, an individual or individuals would require training as to how and when to program (or reprogram the multiplying factor in order to create (or alter) the calculated time delay of the Mårtensson device. And, in order to achieve optimum boiler efficiency, one of these trained individuals may need to be present on a seasonal basis (for example) to reprogram the device with an optimal multiplying factor for given heating conditions.

Therefore, there is a need for a device or system that optimizes the efficiency of heating controllers such as the Mårtensson device by making the controller self-calibrating and self-optimizing while requiring little or no human intervention. This need is particularly acute for boilers used in a residential setting where "house calls" by trained technicians can be rather expensive.

SUMMARY OF THE INVENTION

The present invention provides a self-optimizing device and method for use with a thermal transfer system. Although the invention is primarily described as being applicable to one or more oil or gas fired boilers, it is understood that the invention has other applications as well, such as for use with air conditioners or other cooling systems.

An apparatus of the invention controls a heating unit in a manner so as to improve the energy efficiency of the heating unit using an autocalibration processor. The heating unit controlled by the controller of the invention employs a heating medium that is heated by the heating unit and which transfers the heat into an ambient atmosphere outside of the heating unit. The heating unit has an on-state initiated when a characteristic of the heating medium representative of the heating capacity of the medium decreases below a minimum level, and an off-state initiated when the characteristic of the heating medium reaches a maximum level.

The controller includes an input element, an output element, a time-measuring element, and a processor. The input element receives a signal from a sensor, the signal indicating the heating medium characteristic representative of the heating capacity of the heating medium. The output element signals the heating unit to begin its on-state. The time-measuring element measures an off-time, the off-time being the length of time from initiation of the off-state of the heating unit until the characteristic of the heating medium decreases below the minimum level. The processor determines a delay time and for signaling the heating unit to delay initiation of the on-state by the delay time amount, the extension of the off-time resulting in an energy savings over an undelayed initiation. The processor further comprising an autocalibration processor for determining a delay time that results in optimum energy savings.

In one embodiment, the autocalibration processor includes control logic for performing an autocalibration process that begins by measuring on-time and off-time components of a first on-off cycle of the heating unit. The autocalibration processor then selects a second on-off cycle for the heating unit having an off-time similar to (for example, having a length within 15% of) the off-time of the first on-off cycle of the heating unit. The autocalibration process next applies a first delay time prior to initiating a subsequent on-state and calculates an index corresponding to an energy savings for the first delay time. The autocalibration processor then selects a third on-off cycle for the heating unit having an off-time similar to the off-time of the first on-off cycle of the heating unit. A second delay time is then applied prior to initiating a subsequent on-state and an index corresponding to an energy savings for the second delay time is calculated. The autocalibration means can test any number of delay times, and preferable includes testing a delay time that is one hundred percent of the off-time of the first cycle. The autocalibration means then calculates a delay time that corresponds to an optimum energy savings. For example, the autocalibration processor can select a delay time corresponding to the highest energy savings index, or it can interpolate or extrapolate from the test data.

In another embodiment, the autocalibration means continuously calculates optimum economy settings. In this embodiment, the autocalibration means selects an initial economy factor for the processor. It then continuously records a parameter of the heating system corresponding to a thermal load on the system. Based on this parameter, the autocalibration means calculates an optimum economy factor and increments or decrements the processor economy factor in a direction toward the optimum economy factor. Preferably, the parameter is a moving average that covers a long enough time to filter out one day abnormal conditions, but is a short enough time that the average responds promptly to seasonal changes. In one implementation, the optimum economy factor is a delay time percentage that is calculated as optimum economy factor is calculated as $E-(A\times(E\div B))$; where E is the maximum allowed economy factor, A is the parameter of the heating system corresponding to the thermal load on the system, and B is a maximum parameter of the heating system corresponding to the thermal load of the system.

By applying the apparatus or method of the invention, the operation of a heating system can be optimized with little or no human intervention. The apparatus can be a self contained controller having a user interface, or it can interface with a computer network using known computer communication means.

BRIEF DESCRIPTION OF THE DRAWINGS

The invention will be more fully understood from the following detailed description taken in conjunction with the accompanying drawings, in which.

DETAILED DESCRIPTION OF THE DRAWINGS

Figure 1:
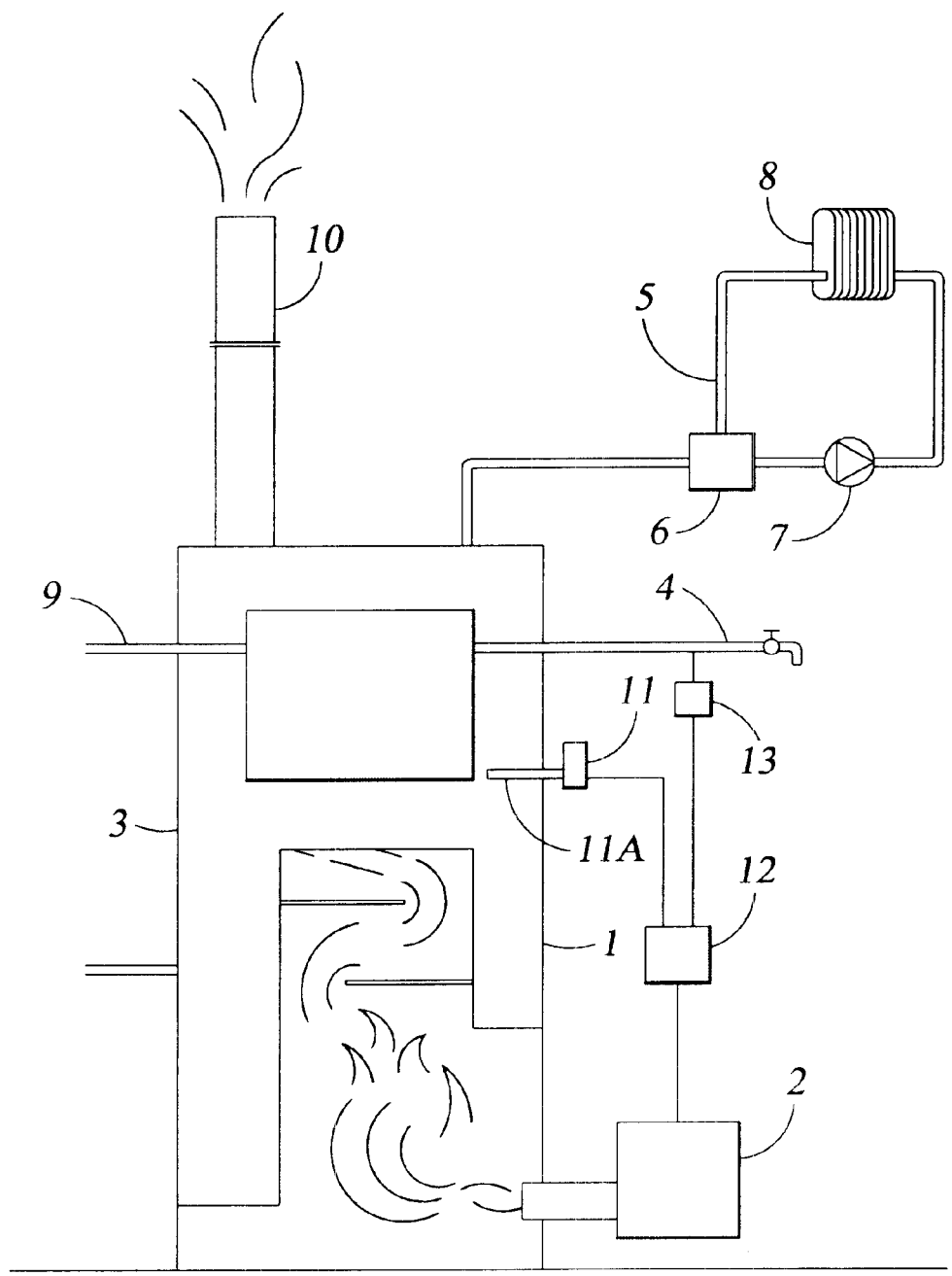
FIG. 1 is a schematic view of a heating unit of the invention.

FIG. 1 illustrates an exemplary heating system of the invention. The heating system includes a boiler 1, which includes or is otherwise coupled to a burner 2 and a tank 3, wherein the tank contains a heating medium that is heated by the burner as shown in FIG. 1. Although FIG. 1 depicts an oil burner 2, the present invention is equally applicable to a gas burner or other heating elements known in the art for heating a heating medium which in turn provides heat to a desired environment. The heating medium for the boiler 1 is generally water or steam, either of which is supplied to the tank 3 by a conduit 9, and which can be heated by the burner to produce either hot water or steam as a heating medium.

The heating system can also include a conventional shunt valve 6, and a circulation pump 7 to direct the heating medium into at least one radiator 8, which transfers heat from the heating medium to the area(s) to be heated. The heating system can also provide hot water for a tap water system 4. Additionally, the system includes an exit port 10, such as the chimney shown in FIG. 1, for discharging by-products, such as gases, resulting from the combustion of oil or gas by the burner 2.

The boiler 1 has an "on-time" during which the burner 2 is actively heating the heating medium. The boiler also has an "off-time" during which the burner is not actively heating the heating medium, but during which demand (i.e., heating or thermal load) is being placed upon the heating medium to continue to heat the area(s) to be heated. Generally, the thermal load depends upon the size of the area being heating and the difference between indoor and outdoor temperatures as well as insolation characteristics of the building being heated. The on-time of the boiler 1 generally commences when the load placed upon the heating medium is such that the temperature of the heating medium underpasses a minimum temperature level (if the heating medium is water) or pressure level (if the heating medium is steam). Generally, the on-time of the boiler ends, and the off-time of the boiler commences, when the heating medium overpasses a maximum temperature level (if the heating medium is water) or pressure level (if the heating medium is steam). Thus, a characteristic representative of the heating capacity of the heating medium, such as temperature for water or pressure for steam, determines the on-time and the off-time of the boiler. The exact commencement of the on-time and the off-time are triggered by signals from a detecting means 11 to a delay means 12 as will be described in more detail below.

Where the heating medium is water, detecting means 11 is typically a thermal switch, where the heating medium is steam, it is a pressure switch. While the following discussion applies a thermal switch, a person of ordinary skill in the art will understand that the detecting means can be selected so as to be appropriate for the heating medium used. Thermal switch 11 is generally adapted to have at least two functions. First, the thermal switch 11 detects the temperature of the heating medium in the boiler 1, and second, the thermal switch produces a signal representing the detected temperature of the heating medium. The first function of the thermal switch 11 is achieved by a temperature sensing component 11a of the thermal switch, which is positioned within the tank 3, for example as shown in FIG. 1, to accurately obtain the temperature of the heating medium. The second function of the thermal switch 11 is achieved by the connection of the thermal switch in series to the delay means 12 such that the thermal switch can send signals to the delay means. These signals generally represent, for example using voltage, the temperature of the heating medium as obtained by the temperature or pressure sensing component 11a of the thermal switch 11. The delay means 12 uses this signal to determine when the heating medium has underpassed or overpassed the predetermined minimum or maximum heating characteristic values, thus determining the on- and off-times, respectively.

In a first embodiment of the invention, the delay means 12 generally includes a controller that is directly connected to one or more burners 2 as shown in FIG. 1. The controller typically includes a central processing unit such as a microprocessor or special purpose processor, or may be implemented using an Application Specific Integrated Circuit (ASIC). Software can be provided to the controller by storing instructions in random access memory (RAM), read-only memory (ROM), erasable programmable read-only memory (EPROM), or the like which is accessible by the microprocessor or special purpose processor to instruct the controller as to functions it will perform using the input signals described above. In addition, the controller may be a general-purpose computer such as a Windows PC which can be directly connected to the boiler 3 as indicated in FIG. 1, or connected to a special purpose delay means 12 by a data communications link. The controller can also store data that is measured by the heating system or calculated by the controller using a volatile memory source such as a cache memory directly linked to the processor, or by storing the data in permanent form by exporting the data to a disk drive or to a general purpose computer having a disk drive.

The delay means is adapted to have at least two functions. First, the delay means 12 receives input signals from the thermal switch 11 representing a thermal capacity characteristic of the heating medium, and processes and/or stores these signals. Second, the delay means 12 includes an autocalibration means that measures certain on- and off-time intervals that during heating cycles, tests at least two different delay times, calculates energy savings indices for the delay times tested and then selects an optimal delay time (or delay time factor for calculating a delay time) which, in turn, the delay means uses during normal heating operations to delay the reactivation of the burner 2 of the boiler 1. These functions are outlined in detail in the flow diagram of FIG. 2.

Figure 2:
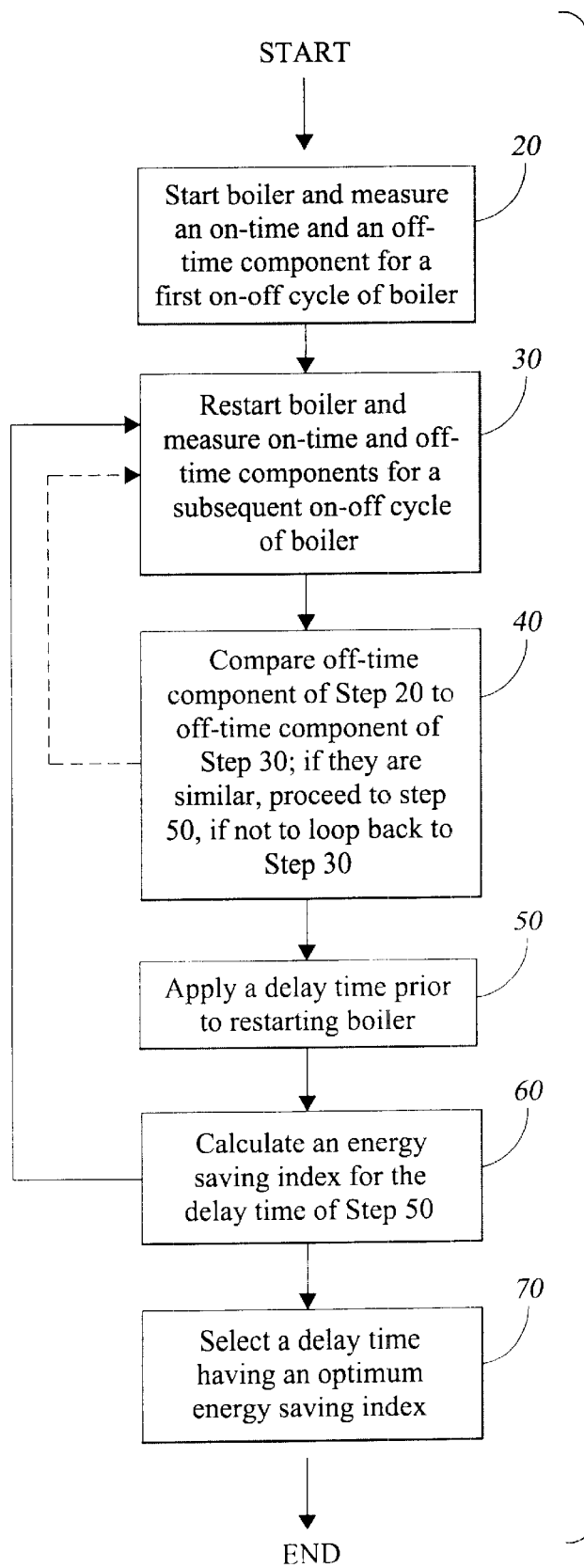
FIG. 2 is a flow diagram of a process for self-optimizing the heating unit of FIG. 1.

FIG. 2 illustrates a process of the first embodiment of the invention wherein delay time factors for calculating a delay time for reactivation of the boiler 2 are tested, and an optimum delay time factor is selected. One of ordinary skill in the art will readily ascertain that the process of FIG. 2 can include more or fewer steps while keeping within the spirit of the invention.

During the first step 20 of the process of FIG. 2, the delay means 12 measures an off-time and on-time for a first on-off cycle of the boiler. A boiler on-off cycle is equivalent to the total time that elapses between when the boiler is activated, deactivated, and then first reactivated after having been deactivated. As discussed above, the on-time component of an on-off cycle is equivalent to the time between when the boiler is activated and when the boiler is deactivated, while the off-time component of an on-off cycle is equivalent to the time between when the boiler is deactivated and when a characteristic of the heating medium underpasses a predetermined minimum value. At this point in the cycle, the delay means 12 applies a delay time to prevent the boiler from activating until that delay time expires. However, for the purpose of step 20, no delay time (or a delay time of zero) is employed.

Once the on-time and off-time of the first on-off cycle have been measured and stored in accordance with step 20, step 30 of the process begins. Because no delay time is employed in step 20, step 30 begins with boiler reactivation as soon as the delay means receives signals from the thermal switch that the minimum temperature or pressure level has been underpassed. Step 30 continues by measuring the on-time component and the off-time component of the subsequent on-off cycle, and then moves to step 40 before restarting the boiler to start a new cycle.

At step 40, the delay means examines the off-time component of the on-off cycle of step 30. If the off-time component of the on-off cycle of step 30 is similar to (i.e., about 5% to about 15% greater or less than) the off-time component of the first on-off cycle of step 20 (indicating that the heating system is operating under a load similar to that of the first cycle), the process moves to step 50, if not, the process loops back to step 30. This loop between steps 40 and 30 will continue until an on-off cycle of step 30 has an off-time component which is sufficiently similar to the off-time component of the first on-off cycle of step 20.

In step 50, a delay time is applied prior to restarting the boiler. Delay time represents the time between when the delay means 12 receives a signal from the thermal switch 11 that the minimum temperature for the heating medium has been underpassed, and when the delay means 12 actually sends a signal to the burner 2 to reactivate.

The delay time can conveniently be calculated from the off-time using a delay time factor, such as by multiplying the current off-time (as measured by the under passing of the minimum temperature of the heating medium) by a percentage to determine a delay time to be added to the off-time. An exemplary delay time for this (second) on-off cycle is approximately 10% of the off-time component of the on-off cycle. Step 50 is concluded by reactivating the boiler after applying the first delay time.

The process of FIG. 2 then continues to step 60, which consists of calculating an energy savings index that results from the use of a particular delay time factor. The Energy Savings Index (ESI) is a representation of the efficiency of the boiler, and is obtained by measuring certain on-off cycle characteristics. The ESI is calculated by utilizing control logic or software contained within the autocalibration portion of the delay means.

In an exemplary step 60, an ESI is calculated in the following manner. As the boiler completes an on-off cycle, the delay means stores the on-time, and off-time, and total on-off cycle time. The delay means then divides a predetermined time period by that total on-off time in order to calculate the total number of on-off cycles of the boiler that would occur during that predetermined time period. Generally, the predetermined time period is 24 hours, but can be greater or less than 24 hours. The total number of on-off cycles that would occur during the predetermined time period is then multiplied by the on-time component as a percentage of the on-off cycle to determine how long the boiler would be on during that predetermined time period. The amount of time that the boiler would be activated during a predetermined time period can be a proxy for the amount of fuel that the boiler will use in that same time period.

The ESI is then calculated as a representation of the on-time savings (i.e., boiler efficiency) that is achieved for the predetermined time period when employing a particular delay time factor when compared to the undelayed cycle of step 20.

Once an ESI is calculated via step 60, the process should loop back to step 30 in order to calculate several other ESI's using several different delay time factors. As more delay time are tested to calculate EIS's , more EIS's can be compared in order to determine optimum boiler efficiency. Each successive delay time factor can be related to the previous delay time factor that was used to calculate an ESI. For example, delay time factors can be tested in 10% increments (10% of the off-time, 20%, 30%, etc.).

Once a satisfactory number of EIS's are calculated (preferably including delay time factors of at least up to 100%) and stored by the delay means, the process can continue to step 70, wherein the delay means selects a delay time factor that provides an optimum ESI based upon the prior stored EIS's. To select this delay time factor, the delay means can either select one of the stored delay time factors that corresponds to a particular ESI, or can calculate a delay time factor based on the stored prior delay times that correspond to particular EIS's, such as by interpolating or extrapolating to an optimum value.

The delay means can be adapted to store any data associated with a particular ESI including, but not limited to, the time of day at which it was measured, the season and/or month and/or specific calendar date on which it was measured, the atmospheric temperature(s) during the on-off cycle that proceeded the delay time, and the delay time that was used to obtain the ESI. To select an optimum delay time factor for the boiler, the delay means may compare all stored EIS's and all stored information in order to arrive upon a delay time factor that would provide the optimum boiler efficiency. The delay means may, however, be adapted to selectively examine certain stored data in order to arrive upon an optimum delay time for a particular set of circumstances. For example, the microprocessor could be programmed to examine EIS's and stored data that were obtained only during a certain temperature window or a certain seasonal time window.

In a second embodiment of the invention, the autocalibration means includes an Automatic Economy Calculation that constantly determines demand by monitoring the on/off duty cycle of the boiler. For the purpose of this description, the on and off cycles refer to "undelayed" on and off cycles, that is, the off cycle is calculated as the time from when the burner shuts off until the heating characteristic of the heating medium underpasses the predetermined minimum value set for the boiler. Shorter off cycles and longer on cycles indicate greater heating demand, while longer off cycles and shorter on cycles evidence reduced demand. At higher levels of demand, the boiler generally operates closer to its design capacity and the controller of the invention has less economizing impact. The autocalibration means of this second embodiment applies this principle to increase the applied economy factor toward a calculated optimum if heating demand is increasing, and to gradually reduce the applied economy factor toward a calculated optimum if heating demand is decreasing.

Figure 2A:
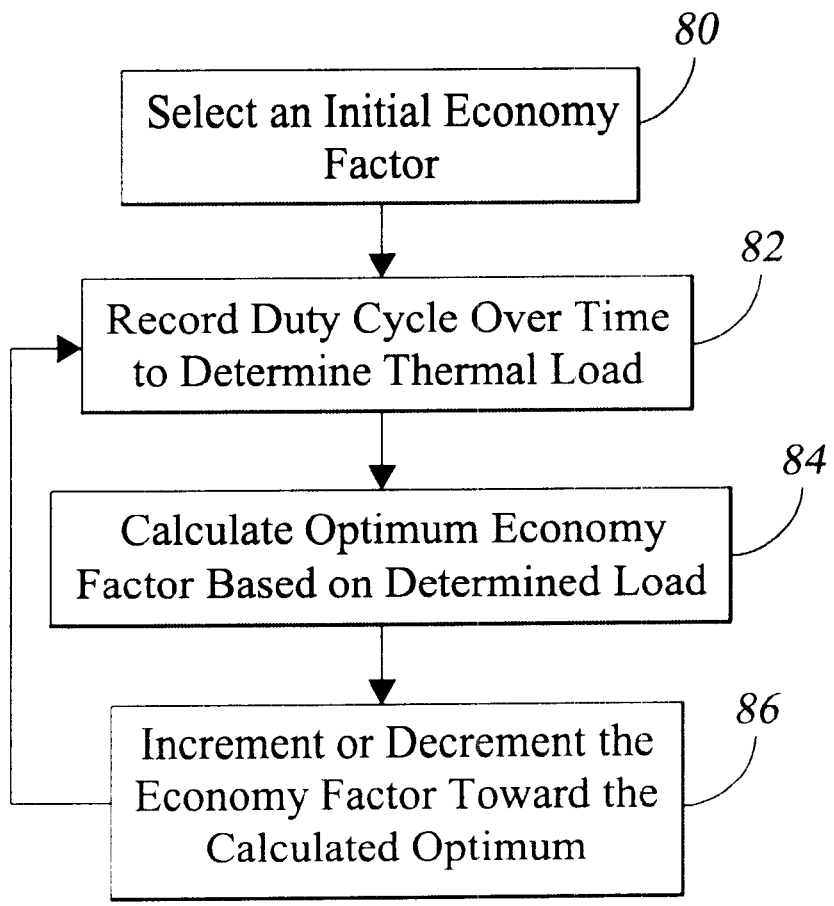
FIG. 2A is a flow diagram of an additional process for self-optimization using the heating unit of FIG. 1.

FIG. 2A illustrates an exemplary method for implementing the autocalibration means of the second embodiment. In this example, the process begins by selecting an initial economy factor 80. One factor useful for this initial selection is a 60% delay factor that will delay the ignition of a burner for 60% of its undelayed off-time. Other factors could be selected and a 60% delay factor would not be optimal under all possible burner capacity and thermal load conditions, however, for typical installations, this value should provide an energy savings over a thermal system that does not employ a controller of the invention.

Next, the autocalibration means records a parameter representing the duty cycle of the heating system over time to determine the thermal load on the system 82. One such parameter is the on-time of the burner compared to the total on-time and undelayed off-time of the burner. This parameter may be conveniently expressed as a percentage on-time over the course of a 24 hour period and would thus represent the thermal load on the heating system over one day. In one preferred embodiment, a moving average of the thermal load parameter is calculated by averaging daily parameter values over a predetermined number of days such as a 20 day moving average. In this way, one day temperature swings or other unusual short term thermal loads on the system will not cause dramatic changes in the moving average, but the moving average should be taken over a short enough period reflect seasonal trends in a timely way.

Using the determined thermal load parameter, the autocalibration means next calculates an optimum economy factor 84. A preferred method of calculation uses the following formula:

$$F=E-(A\times(E+B));$$

where

F is the calculated economy factor;

A is the average boiler on percentage as calculated above;

B is the maximum boiler on percentage; and

E is the maximum allowed economy factor.

Where the economy factor is a delay factor as described above, the maximum allowed economy factor may conveniently be set to a default of 100% of the off-time. Similarly, the maximum boiler on percentage can be set to a value above which the boiler is operating so close to its design capacity that little further savings can be realized. A convenient estimate of this value is 70%. By way of example, and using the default settings described herein, a high-demand average boiler on percentage of 40% would result in a calculated economy factor of 43%; a more typical demand with an average boiler on percentage of 20% would result in a calculated economy factor of 71%; and a low-demand average boiler on percentage of 5% would result in a calculated economy factor of 93%.

Once the economy factor is calculated, the existing economy factor applied by the controller is incremented or decremented toward the calculated economy factor. The controller may simply jump to the calculated economy factor, however because large changes in the calculated economy factor can be the result of anomalous conditions, it can be preferable to gradually change the setting toward the calculated optimum, for example by 1% per day toward the calculated value, to avoid overshooting based on unusual conditions.

Of course, whatever the calculated economy factor, this factor can be overridden by low temperature alarm settings. In addition, a minimum economy factor may be set, 40% for example, so that some savings is always achieved.

Figure 3:
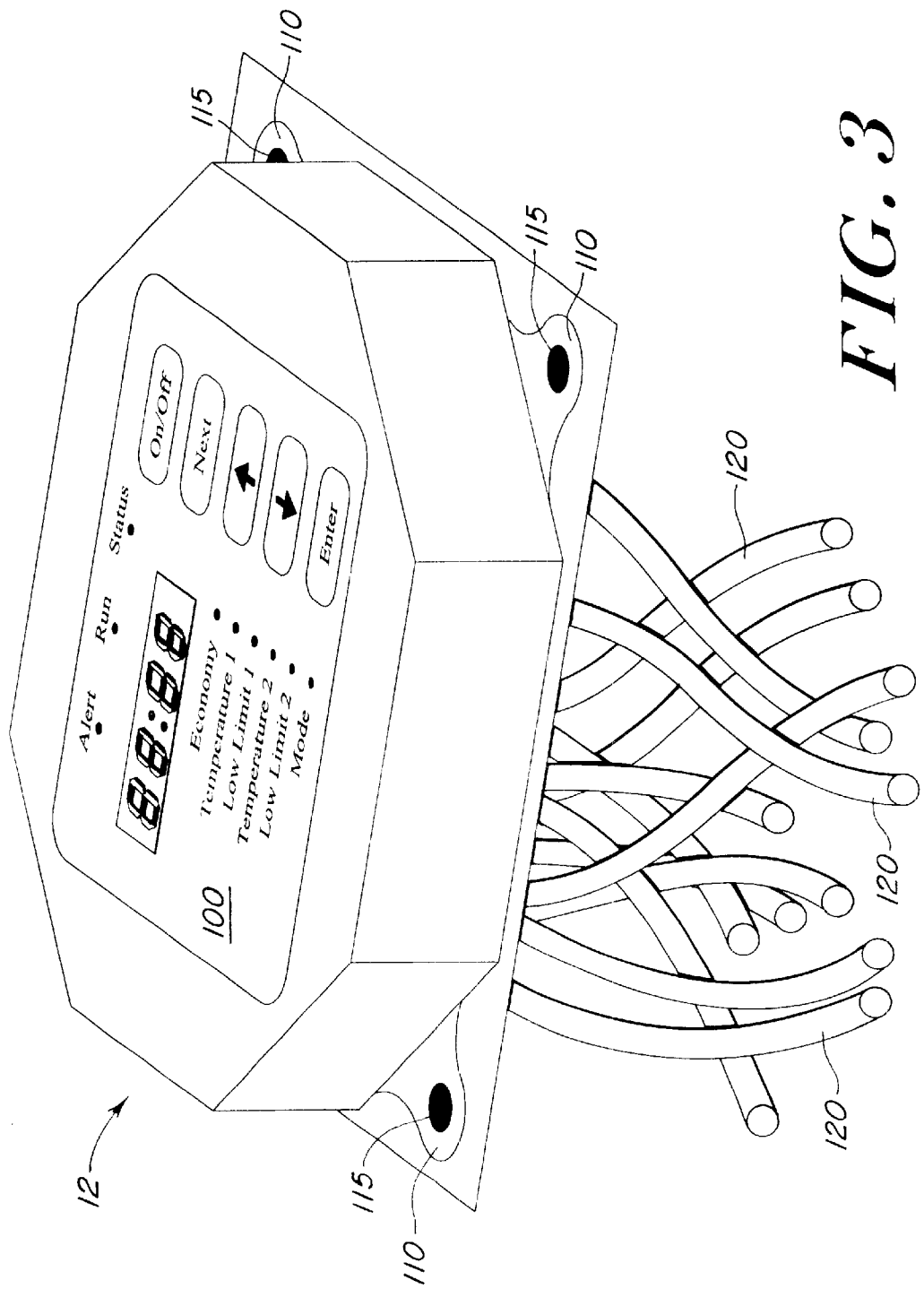
FIG. 3 is a perspective view of a controller used to effectuate the self-optimization of the heating unit of FIG. 1 in accordance with the process of FIG. 2.
Figure 4:
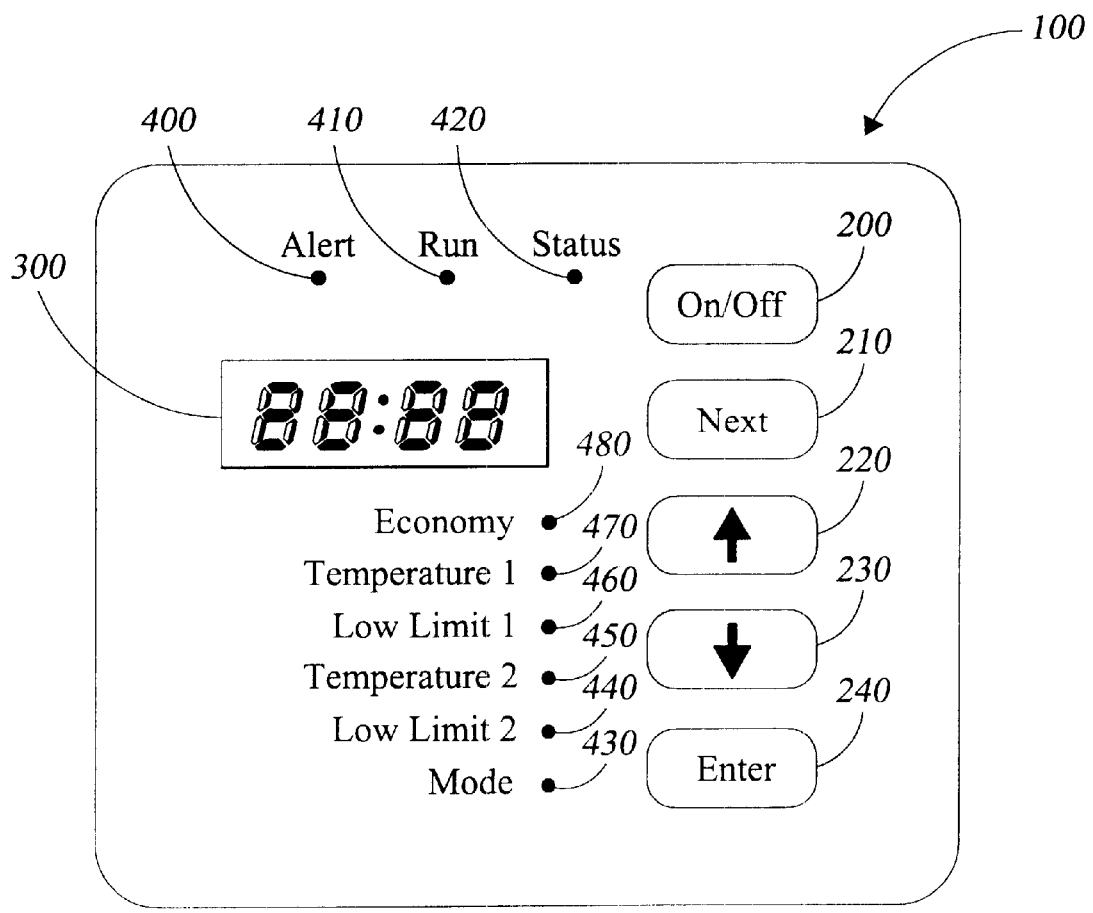
FIG. 4 is a top view of the display face of the controller of FIG. 3.

The construction of a delay means 12 particularly useful for controlling a residential heating system with either embodiment of the autocalibration means is illustrated in FIGS. 3 and 4. FIG. 3 depicts an exemplary delay means 12 in which the process of FIG. 2 takes place. The delay means 12 includes a display face 100, at least two attachment areas 110 and wires 120 connected to internal circuitry. The delay means 12 is adapted to be installed in a new heating system or retrofitted to an existing heating system through connection of the attachment areas 110 and the wiring 120 to the boiler. The device can be sized to fit onto a standard 4×4 electrical junction box (not shown) in order to facilitate the installation or retrofitting process. In the exemplary embodiment depicted in FIG. 3, the delay means 12 has four attachment areas 110 (three of which are shown) that each have an insertion hole 115 defined therethrough. A screw or other device known in the art is placed at least two insertion holes 115 so that the delay means 12 can be easily connected and assuredly secured onto an electrical junction box or other portion of the boiler.

Because of the high-temperature environment in which the microprocessor 12 is placed, it should be constructed, painted, coated, or plated with a corrosion-resistant and flame retardant material and tested in accordance with local building regulations.

The display face 100 of the delay means 12 is shown in close detail in FIG. 4. Display face 100 contains indicators for the operating status and operating conditions of the delay means 12, the boiler 1, and the heating medium. The exemplary display face also contains buttons or switches or other means known in the art to allow for human alteration or override of the operating status and conditions. The exemplary display face of FIG. 4 contains ten separate indicators (300, 400, 410, 420, 430, 440, 450, 460, 470, 480) of the operating status and operating conditions, as well as five condition variation buttons (200, 210, 220, 230, 240). One of ordinary skill in the art will recognize that the number, location and size of these indicators may be varied from their representation in FIG. 4 and their description below.

Each of the indicators consists of an icon and accompanying text. Both the icon and the text should be viewable by the unaided eye under well-lit or poorly-lit conditions. In an exemplary embodiment of FIG. 4, the indicators are each LED displays adapted to broadcast either a solid or intermittently blinking red or green image. Indicator 300 is an alphanumeric display that will normally display data pertaining to one of indicators 430, 440, 450, 460, 470 and 480 as will be described in more detail below. Each condition variation button 200, 210, 220, 230, 240 includes either text or a symbol thereupon. Like the text of the indicators, this text and symbols can be written so as to be readable by the unassisted eye in well-lit or poorly-lit conditions.

On/off button 200 allows for manual control over whether the delay means is actively influencing the operation of the boiler 1. When the on/off button 200 is pressed, indicator 300 can display either the word "on" or the word "off" in green or red LED lettering to indicate whether the microprocessor is actively influencing the operation of the boiler ("on") or not actively influencing the operation of the boiler ("off"). Alternatively, status light 420 could be employed, for example, by blinking when the delay means is online and remaining on when the delay means is off-line.

The Next button 210 controls the selection of one of the indicators 430, 440, 450, 460, 470, 480 to result in information associated with the selected indicator being displayed on LED display 300. Whichever of indicators 430, 440, 450, 460, 470, 480 is currently selected will have its associated indicator light solidly illuminated will have its associated value displayed on indicator 300.

Once an indicator 430, 440, 450, 460, 470, 480 is illuminated, its associated value can be set to a desired setting using arrow keys 220, 230, then the enter button 240 may be pressed to store the desired setting in non-volatile memory.

Each of indicators 430, 440, 450, 460, 470 and 480 has a specific function. Economy indicator 480, when displayed, can show the presently utilized delay time factor and, during a delay time, can display a count-down on indicator 300 of the delay time until the boiler will be reactivated. Temperature 1 indicator 470 generally indicates the current temperature of the heating medium. Temperature 2 indicator 450 indicates a second temperature measured by the system. For example, the system may measure the temperature of the hot water in a tap water system heated by the boiler.

Referring again to FIG. 1, the boiler 1 may also include a sensor element 13. The sensor element 13 is in communication with both the delay means 12 and the tap water system 4. The sensor 13 is adapted to detect the temperature of the tap water system 4, and to deliver signals to the delay means 12 to immediately cause the delay means to activate or reactivate the boiler regardless of other factors and/or programmed information. This is to ensure that the temperature of the tap water system 4 does not fall below a predetermined temperature, for example 45° C., and/or to ensure that regardless of the delay time selected by the delay means 12, the tap water system 4 can supply water that has a high enough temperature for a shower or bath or the like.

Low Limit 1 indicator 460 allows the setting of a low limit override temperature, which is displayed in indicator 300. This temperature can be raised or lowered by, respectively, the up arrow button 220 and the down arrow button 230. If the temperature that is stored as the low limit 1, is underpassed by the heating medium (or the tap water system 4 if desired), the delay means will automatically restart the boiler regardless of other factors such as the selected delay time. Low limit 2 indicator 440 is identical in its function to low limit 1, but pertains instead to a low limit temperature for a second temperature measured by the system. This second low limit can be particularly useful to set a minimum desired water temperature for the hot water in a tap water system.

Mode indicator 430 displays the operating mode of the microprocessor in indicator 300. The delay means generally has a heating mode and an economy calculation (ecal) mode, but may also have a cooling mode if the delay means has been adapted to be utilized in conjunction with a cooling system. In the delay means embodiment wherein the delay means first tests then sets an energy savings index, setting the mode indicator 430 to ecal will cause the delay means to run through the process outlined above in FIG. 2. Once the delay means has finished the process of FIG. 2, it can automatically transfer to heating or cooling mode to utilize the data arrived upon through the process of FIG. 2.

Run indicator icon 410 is illuminated during the on-time of the boiler. Alert indicator icon 400 should be adapted to broadcast either a steady or intermittent red image when the heating system is somehow prevented from operating at its programmed capacity due to circumstances wherein one or more of the heating system's components can no longer function properly (e.g., when one of the temperature sensors reports a value that is outside of the normal operating parameters). The broadcasting of the Alert indicator icon 400 can also be accompanied by a warning tone as is known in the art.

Status indicator icon 420 produces a blinking image when the delay means is on-line (i.e., either activated or capable of being activated), and a solid image when the delay means is off-line and cannot be activated. Thus, if one wants to repair the boiler or otherwise remove its components, one can verify that the delay means is off-line by the broadcasting of a solid image by the status icon 420.

While the embodiment described herein refers to a heating system using water or steam as a heating medium in a single location, the principle of the invention can readily be applied in other circumstances. For example, a number of heating systems can be controlled or monitored using the principles of the invention from a single computer. For example, a utility company may monitor or optimize the heating systems of one or more clients at multiple locations using telephone lines and modems as is known in the art to provide a communication link between the delay means and the computer. An Internet or other computer network connection could also be employed to provide the communications link. As a further example, an energy services company having a site on the World-Wide-Web for providing clients with energy or energy savings information and services may also communicate with the delay means of a client's heating system using known computer communication techniques.

In addition, the principle of the invention can be applied to cooling systems as well as to heating systems. In such a system, a chiller, condenser, heat pump, or other device known in the art for cooling a cooling medium, generally replaces the burner 2 of FIG. 1. The cooling medium can be any medium that can be used in a heat exchanger to transfer heat from air in the region to be cooled to the medium. Such a medium could be water, or it could be an evaporating refrigerant known for use in air conditioning systems. Of course, the thermal switch 11 should be suitable for use with the medium chosen, for example, if an evaporating refrigerant is used, the cooling system should turn on when the medium reaches a predetermined pressure. The following discussion assumes water is used as the cooling medium, but the principles will apply to other cooling mediums as well.

In such a cooling system, the on-time portion of a cooling cycle can start when the medium overpasses a predetermined maximum temperature and delay means 12 triggers a chiller (replacing burner 2) to initiate cooling of the medium. When the temperature of the cooling medium drops below a predetermined minimum temperature, the delay means 12 signals the chiller to stop, ending the on-time portion of the cooling cycle and beginning of the off-time cycle. The off-time continues until the temperature of the cooling medium overpasses a predetermined maximum temperature value. At this point, the delay means can calculate a delay time based on a known delay time factor, or it can run through the autocalibration procedure described above with respect to FIG. 2.

A single delay means (whether a self-contained unit as shown in FIG. 3, or connected to or including a general purpose computer as described herein) can also be employed to optimize both a heating and a cooling system. In the description above, the Temperature 1 and Temperature 2 relate to two different boilers, however, the system can readily be adapted to control one boiler and one chiller. This configuration thus allows optimization and control of all environmental temperature control from a single means.

In addition, the controller of the invention can readily be applied to heating or cooling units for other than a building. For example, the invention could be applied to heating and/or cooling systems in automobiles. As electric and hybrid electric vehicles become more common for energy efficiency and environmental reasons, conservation of energy used to heat and cool the interior of the automobile will become highly important. The controller of the present invention can be employed to reduce the length of operation of a compressor, which gains its energy from the motion of the automobile's engine, to improve energy efficiency, and can also be used to manage the distraction of engine coolant (which is typically used as a thermal medium in automotive heating systems) or other heating of a medium for heat transfer to the cabin of an automobile to ensure maximum energy efficiency.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An apparatus for controlling a heating unit, the heating unit employing a heating medium that is heated by the heating unit and which transfers heat into an ambient atmosphere outside of the heating unit, the heating unit having an on-state initiated when a characteristic of the heating medium representative of the heating capacity of the medium decreases below a minimum level, and an off-state initiated when the characteristic of the heating medium reaches a maximum level, the apparatus comprising:

an input element for receiving a signal from a sensor, the signal indicating the heating medium characteristic representative of the heating capacity of the heating medium;

an output element for signaling the heating unit to begin its on-state;

a time-measuring element for measuring an off-time, the off-time being the length of time from initiation of the off-state of the heating unit until the characteristic of the heating medium decreases below the minimum level; and a processor for determining a delay time and for signaling the heating unit to delay initiation of the on-state by the delay time amount, the delay resulting in an energy savings over an undelayed initiation, the processor further comprising an autocalibration processor which tests at least one delay time and calculates an energy savings index for each delay time tested, then calculates an optimum energy savings delay time.

2. The apparatus of claim 1, wherein the delay time is calculated as a function of the off-time.

3. The apparatus of claim 1, wherein the heating medium characteristic is selected from the group consisting of temperature and pressure.

4. The apparatus of claim 1, wherein the autocalibration processor calculates and tests a plurality of delay times and calculates and energy savings index for each delay time tested, then calculates an optimum energy savings delay time.

5. The apparatus of claim 1, wherein the autocalibration processor includes control logic for performing the steps of:

measuring on-time and off-time components of a first on-off cycle of the heating unit, selecting a second on-off cycle for the heating unit, the second on-off cycle having an off-time similar to the off-time of the first on-off cycle of the heating unit;

applying a first delay time prior to initiating a subsequent on-state;

calculating an index corresponding to an energy savings for the first delay time;

selecting a third on-off cycle for the heating unit, the third on-off cycle having an off-time similar to the off-time of the first on-off cycle of the heating unit;

applying a second delay time prior to initiating a subsequent on-state;

calculating an index corresponding to an energy savings for the second delay time; and calculating a delay time having an optimum energy savings index.

6. The apparatus of claim 5, wherein the off-time for each of the second and third on-off cycle is within about 15% of the length of the off-time of the first on-off cycle.

7. The apparatus of claim 5, wherein the delay time having an optimum energy savings index is calculated by selecting the off-time having the highest index.

8. The apparatus of claim 5, wherein the delay time having an optimum energy savings index is calculated by interpolation.

9. The apparatus of claim 1, wherein the calculation of an energy savings index comprises the steps of:
   adding the on-time and off-time components for the on-off cycle to determine a total on-off time component;
   selecting a predetermined time period;
   dividing the predetermined time period by the total on-off time component to determine a total number of on-off cycles that would occur during the predetermined time period; and
   multiplying the total number of on-off cycles by the on-time component to determine how long the heating unit would be in an on-state during the predetermined time period.

10. The apparatus of claim 1, wherein the apparatus is sized so as to be suitable for containment within a standard electrical junction box.

11. The apparatus of claim 1, wherein the apparatus is operable from a user interface associated with the processor.

12. The apparatus of claim 11, wherein the apparatus is operable from a computer network connected to the processor by a computer communication means.

13. An apparatus for controlling a heating unit, the heating unit employing a heating medium that is heated by the heating unit and which transfers heat into an ambient atmosphere outside of the heating unit, the heating unit having an on-state initiated when a characteristic of the heating medium representative of the heating capacity of the medium decreases below a minimum level, and an off-state initiated when the characteristic of the heating medium reaches a maximum level, the apparatus comprising:
   an input element for receiving a signal from a sensor, the signal indicating the heating medium characteristic representative of the heating capacity of the heating medium;
   an output element for signaling the heating unit to begin its on-state;
   a time-measuring element for measuring an off-time, the off-time being the length of time from initiation of the off-state of the heating unit until the characteristic of the heating medium decreases below the minimum level; and
   a processor for determining a delay time and for signaling the heating unit to delay initiation of the on-state by the delay time amount, the delay resulting in an energy savings over an undelayed initiation, the processor further comprising an autocalibration processor wherein the autocalibration processor is responsive to a thermal load on the heating unit to continuously calculate and apply a delay time that results in optimum energy savings, wherein a parameter corresponding to a thermal load is recorded comprising a moving average percentage of the thermal load over time as a function of burner on-time.

14. The apparatus of claim 13, wherein the moving average is taken over a period between 24 hours and one season.

15. The apparatus of claim 13, wherein the autocalibration processor includes control logic for performing the steps of:
   selecting an initial economy factor for the processor;
   recording a parameter of the heating system corresponding to a thermal load on the system;
   calculating an optimum economy factor based on the parameter; and
   incrementing or decrementing the processor economy factor in a direction toward the optimum economy factor.

16. The apparatus of claim 15, wherein the optimum economy factor is calculated as $E-(A\times(E\div B))$; where E is the maximum allowed economy factor, A is the parameter of the heating system corresponding to the thermal load on the system, and B is a maximum parameter of the heating system corresponding to the thermal load of the system.

17. The apparatus of claim 16, wherein A is a moving average.

18. An apparatus for controlling a heat transfer unit, the heat transfer unit employing a thermal medium whose thermal energy is affected by the heat transfer unit and which exchanges heat with an ambient atmosphere outside of the heat transfer unit, the apparatus comprising:
   an input means for receiving a signal from a sensor, the signal indicating a thermal characteristic of the thermal medium;
   a processor means for initiating an on-state and an off-state of the heat transfer unit based on the signal indicating a thermal characteristic of the thermal medium, the processor including:
   a delay calculating means for calculating a delay time based on an economy factor for delaying the initiation of the on-state of the heat transfer unit; and
   an autocalibration means for calculating an optimum economy factor applying the optimum economy factor to the delay calculating means, wherein the optimum economy factor comprises testing at least one delay time and determining an energy savings index for each delay time tested.

19. The apparatus of claim 18, wherein the heat transfer unit is an air conditioning unit.

20. The apparatus of claim 18, wherein the apparatus is operable from a user interface associated with the processor.

21. The apparatus of claim 18, wherein the apparatus is operable from a computer network connected to the processor by a computer communication means.

22. In a heating system employing a heating unit and a heating medium that is heated by a heating unit and which transfers heat into an ambient atmosphere outside of the heating system, the heating unit having an on-state initiated when a characteristic of the heating medium representative of the heating capacity of the medium decreases below a minimum level, and an off-state initiated when the characteristic of the heating medium reaches a maximum level, the heating system further comprising an input element for receiving a signal from a sensor, the signal indicating the heating medium characteristic representative of the heating capacity of the heating medium; an output element for signaling the heating unit to begin its on-state; a time-measuring element for measuring an off-time, the off-time being the length of time from initiation of the off-state of the heating unit until the characteristic of the heating medium decreases below the minimum level; and a processor for determining a delay time based on an economy factor and for signaling the heating unit to delay initiation of the on-state by the delay time amount, the delay resulting in an energy savings over an undelayed initiation, the processor further comprising an autocalibration processor; a method for operating at optimum efficiency comprising the steps of:
   selecting an initial economy factor for the processor;
   recording a parameter of the heating system corresponding to a moving average of the thermal load on the system taken over a period between 24 hours and one season;

calculating an optimum economy factor based on the parameter; and incrementing or decrementing the processor economy factor in a direction toward the optimum economy factor.

23. The method of claim 22, wherein the parameter corresponding to the thermal load is a burner on-time percentage.

24. The method of claim 22, wherein the optimum economy factor is calculated as $E-(A\times(E\div B))$; where E is the maximum allowed economy factor, A is the parameter of the heating system corresponding to the thermal load on the system, and B is a maximum parameter of the heating system corresponding to the thermal load of the system.

* * * * *